(12) United States Patent
Bennett et al.

(10) Patent No.: US 10,899,412 B2
(45) Date of Patent: Jan. 26, 2021

(54) TWO WHEELED VEHICLE

(71) Applicant: Indian Motorcycle International, LLC, Medina, MN (US)

(72) Inventors: Adam D. Bennett, Circle Pines, MN (US); Ian A. Mazeika, Ramsey, MN (US); Michael W. Rafferty, New Brighton, MN (US); Jeffrey M. O'Halloran, Lindstrom, MN (US)

(73) Assignee: Indian Motorcycle International, LLC, Medina, MN (US)

( * ) Notice: Subject to any disclaimer, the term of this patent is extended or adjusted under 35 U.S.C. 154(b) by 32 days.

(21) Appl. No.: 16/122,419

(22) Filed: Sep. 5, 2018

(65) Prior Publication Data

US 2020/0070926 A1    Mar. 5, 2020

(51) Int. Cl.
*B62K 19/40* (2006.01)
*B62J 7/04* (2006.01)
*B62J 9/20* (2020.01)

(52) U.S. Cl.
CPC .............. *B62K 19/40* (2013.01); *B62J 7/04* (2013.01); *B62J 9/20* (2020.02)

(58) Field of Classification Search
CPC ..... B62K 19/40; B62J 7/04; B62J 7/08; B62J 9/001; B62J 9/006; B62J 9/00
See application file for complete search history.

(56) References Cited

U.S. PATENT DOCUMENTS

| | | | |
|---|---|---|---|
| 2,771,305 A | 11/1956 | Buegeleisen | |
| 4,066,290 A | 1/1978 | Wiegert | |
| 4,082,345 A | 4/1978 | Willey | |
| 4,269,445 A | 5/1981 | Gager, Jr. | |
| 4,650,204 A | 3/1987 | Bothwell | |
| 4,657,299 A | 4/1987 | Mahan | |
| 4,993,731 A | 2/1991 | Fuller | |
| 5,664,715 A | 9/1997 | Gogan | |
| 5,732,965 A | 3/1998 | Willey | |
| D424,507 S | 5/2000 | Parsons | |
| 6,161,513 A | 12/2000 | Lohr | |
| 6,196,614 B1 | 3/2001 | Willey | |
| 6,347,804 B1 | 2/2002 | Seibel | |
| 6,443,344 B1 | 9/2002 | Nicosia | |
| 6,484,914 B1 | 11/2002 | Willey | |
| 6,520,275 B2 | 2/2003 | Galbraith | |

(Continued)

FOREIGN PATENT DOCUMENTS

| | | |
|---|---|---|
| DE | 3420352 | 1/1985 |
| EP | 0968909 | 1/2000 |

(Continued)

OTHER PUBLICATIONS

Witchdoctors—How to install saddle bag fillers on a Cross Bike, https://www.youtube.com/watch?v=VmddXShHj6E, Jun. 21, 2013. (Year: 2013).*

(Continued)

*Primary Examiner* — Corey N Skurdal

(74) *Attorney, Agent, or Firm* — Faegre Drinker Biddle & Reath LLP

(57) ABSTRACT

A two wheeled vehicle is disclosed having a rear fender and a saddlebag coupled adjacent to the vehicle and spaced apart from the fender defining a gap between the fender and the saddlebag. A closeout is positioned in the gap.

32 Claims, 9 Drawing Sheets

(56) References Cited

U.S. PATENT DOCUMENTS

| | | | |
|---|---|---|---|
| 6,520,545 | B2 | 2/2003 | Johll, Jr. |
| D477,551 | S | 7/2003 | Stahel |
| 6,595,877 | B2 | 7/2003 | Pearson |
| 6,736,441 | B1 | 5/2004 | Barber |
| 7,055,454 | B1 | 6/2006 | Whiting |
| 7,150,382 | B2 | 12/2006 | Zickefoose |
| 7,222,582 | B1 | 5/2007 | Whiting |
| D547,255 | S | 7/2007 | Savage |
| 7,311,232 | B2 | 12/2007 | Watanabe |
| 7,975,640 | B1 | 7/2011 | Whiting |
| 8,151,925 | B2 | 4/2012 | Aramayo |
| 8,272,460 | B2 | 9/2012 | Song |
| 8,579,169 | B2 | 11/2013 | Racz |
| 8,596,941 | B2 | 12/2013 | Marlow |
| 9,958,111 | B2 | 5/2018 | Oltmans |
| 2002/0185323 | A1 | 12/2002 | Tsutsumi |
| 2003/0010558 | A1 | 1/2003 | Buell |
| 2004/0007567 | A1 | 1/2004 | Downey |
| 2005/0150921 | A1 | 7/2005 | Schneider |
| 2009/0001114 | A1 | 1/2009 | Sonnetag |
| 2009/0079219 | A1 | 3/2009 | Caprio |
| 2013/0220257 | A1 | 8/2013 | James |
| 2015/0129342 | A1 | 5/2015 | O'Rourke |
| 2015/0130209 | A1 | 5/2015 | Hamlin |
| 2016/0318569 | A1 | 11/2016 | Zellmer |

FOREIGN PATENT DOCUMENTS

| | | |
|---|---|---|
| EP | 1515037 | 3/2005 |
| EP | 1614886 | 1/2006 |
| EP | 2371688 | 10/2011 |
| GB | 733208 | 7/1955 |
| JP | S5926090 | 1/1984 |
| JP | 2001106150 | 4/2001 |
| JP | 2005153664 | 6/2005 |
| JP | 2013018307 | 1/2013 |
| WO | WO 2006/073244 | 7/2006 |

OTHER PUBLICATIONS

Witchdoctors—How to Install Lower Bag Fillers on a Victory Cross Bike, https://www.youtube.com/watch?v=OszgbqttliM, Aug. 28, 2013.*

Klock Works, Saddlebag Fillers, http://www.getklocked.com/shop/media/catalog/product/0/5/0504-fillers03r1.pdf, 2016. (Year: 2016).*

Witchdoctor's Upper and Lower Bag Fillers Flat Black, https://buywitchdoctors.com/products/upper-and-lower-bag-fillers-flat-black-by-witchdoctors-wd-uplofb (Year: 2013).*

Photo of EDGE Brackets Quick Release Saddlebag System Installation with Mustang Hard Bags, available at https://www.youtube.com/watch?v=2CP_f3cTQeU, May 28, 2009; 1 page.

Photo of Victory's Matthew Cardenas talks about new saddlebag system, available at https://www.youtube.com/watch?v=ttr0AFAzWac, Aug. 1, 2012; 1 page.

Examination Report No. 1 issued by the Australian Government IP Australia, dated Aug. 25, 2017, for Australian Patent Application No. 2014346428; 4 pages.

International Preliminary Report on Patentability issued by the European Patent Office, dated Mar. 1, 2016, for International Patent Application No. PCT/US2014/065012; 41 pages.

International Search Report issued by the European Patent Office, dated Jun. 5, 2015, for International Patent Application No. PCT/US2014/065012; 11 pages.

Written Opinion issued by the European Patent Office, dated Jun. 5, 2015, for International Patent Application No. PCT/US2014/065012; 19 pages.

* cited by examiner

TWO WHEELED VEHICLE

BACKGROUND OF THE INVENTION

The present disclosure relates to a two-wheeled vehicle and, more particularly, to a motorcycle having accessories, such as a saddlebag and/or a trunk.

Conventional two-wheeled vehicles include a frame for supporting an operator. The frame may also support a passenger rearward of the driver. An engine is typically positioned below the driver and is coupled to the frame. The front of the vehicle may include a panel or cover positioned forward of the driver for supporting additional components of the vehicle, for example a light. The rear of the vehicle may include a cargo area, for example saddlebags extending laterally outward from the frame.

The saddlebag may be coupled through the fender to the frame, providing a gap between the fender and the saddlebag. When a trunk is used, the gap is covered by the trunk, but when the trunk is not used, the gap provides a cosmetically displeasing look.

SUMMARY OF THE INVENTION

In an exemplary embodiment of the present invention, a two wheeled vehicle, comprising a front ground wheel and a rear wheel; a frame supported by the front and rear ground engaging members; a seat to support a least one rider; a rear fender positioned over the rear wheel; a saddlebag positioned adjacent to the rear fender and supported by the frame; and an upper closeout for positioning between a gap defined between the rear fender and the saddlebag, the closeout being toollessly coupled to the vehicle.

A further exemplary embodiment of the present invention includes a two wheeled vehicle, comprising a front ground wheel and a rear wheel; a frame supported by the front and rear ground engaging members; a seat to support a least one rider; a rear fender positioned over the rear wheel; a saddlebag positioned adjacent to the rear fender and supported by the frame defining a gap between the saddlebag and the fender; a coupler supported by the frame and positioned adjacent to the gap; and an upper closeout for positioning in the gap, the upper closeout having a latching mechanism to engage the coupler and retain the upper closeout in position in the gap.

A further exemplary embodiment of the present invention includes a closeout mechanism for filling the gap between a saddlebag and fender of a two wheeled vehicle, where the two wheeled vehicle includes a coupler supported by the frame and positioned adjacent to the gap, the closeout comprising an upper closeout for positioning in the gap, the upper closeout having an outer generally smooth surface and a latching mechanism on an inner and opposite surface as the outer surface to engage the coupler and retain the upper closeout in position in the gap.

The above mentioned and other features of the invention, and the manner of attaining them, will become more apparent and the invention itself will be better understood by reference to the following description of embodiments of the invention taken in conjunction with the accompanying drawings.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present invention primarily involves a touring motorcycle, it should be understood, that the invention may have application to other types of vehicles such as three-wheeled vehicles, all-terrain vehicles, motorcycles, watercraft, utility vehicles, scooters, golf carts, and mopeds.

Figure 1:
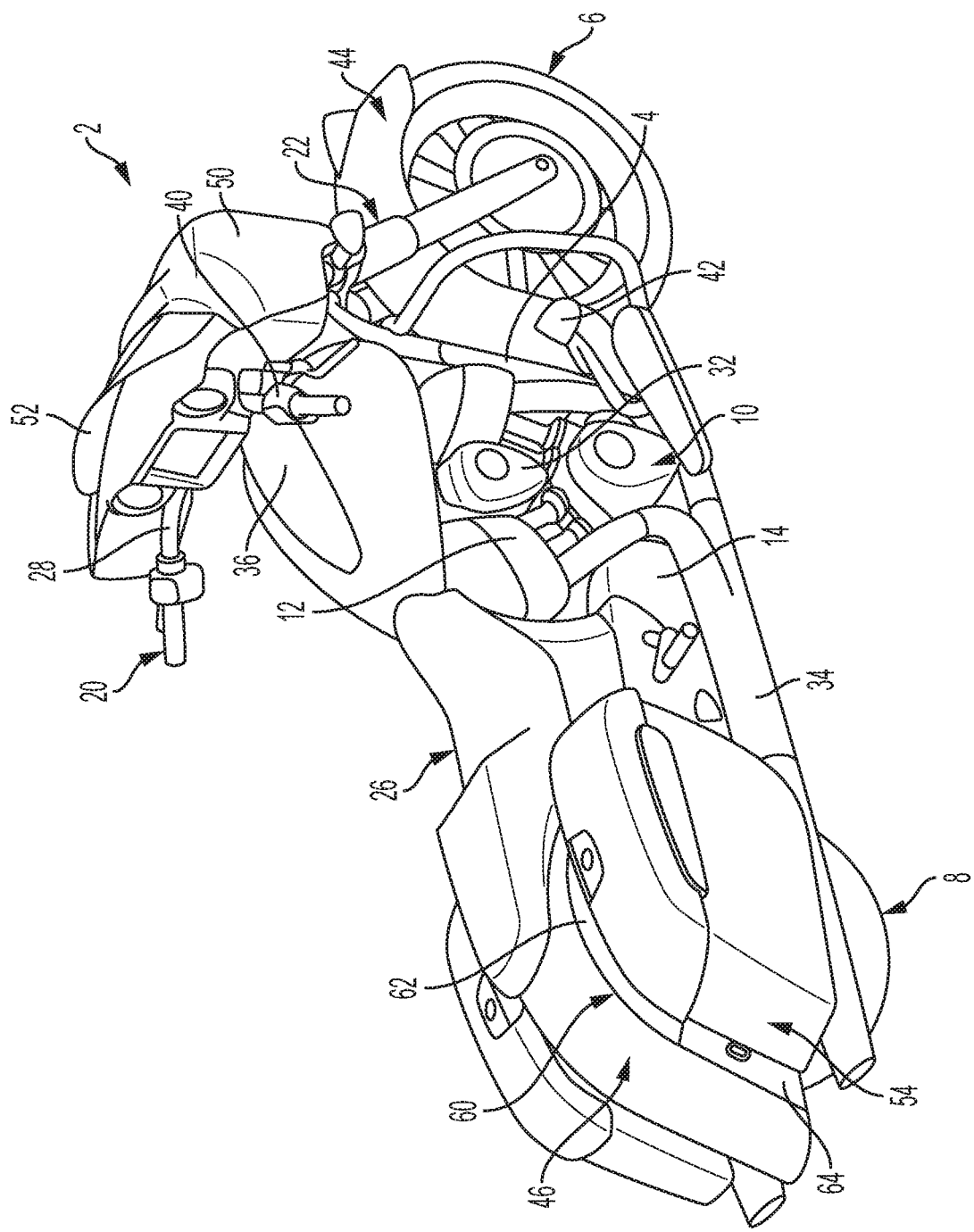
FIG. 1 is a right rear perspective view of a two-wheeled vehicle.

With reference first to FIG. 1, an illustrative embodiment of a two-wheeled vehicle 2 is shown. Vehicle 2 as illustrated is a touring style motorcycle although the majority of components may be used for a cruiser style motorcycle as described herein. Vehicle 2 may also include any features known from U.S. Pat. No. 7,883,136, entitled "TWO-WHEELED VEHICLE", the disclosure of which is expressly incorporated by reference herein.

General features from the following references may also be included, to include U.S. Pat. No. 7,748,746, entitled "FUEL TANK ARRANGEMENT FOR A VEHICLE"; U.S. Pat. No. 7,669,682, entitled "REAR SUSPENSION FOR A TWO WHEELED VEHICLE"; U.S. Pat. No. 7,658,395 entitled "TIP OVER STRUCTURE FOR A TWO WHEELED VEHICLE," are also expressly incorporated by reference herein. An engine and powertrain for the vehicle may be similar to that shown in U.S. Pat. No. 9,194,278 entitled "ENGINE", the disclosure of which is expressly incorporated by reference herein. Other features of vehicles, including the saddlebag configurations may be included from U.S. Pat. No. 9,394,859 entitled "TWO-WHEELED VEHICLE", and U.S. Pat. No. 9,421,860 entitled "TWO-WHEELED VEHICLE", the disclosures of which are expressly incorporated by reference herein.

Vehicle 2 includes a frame 4 (FIG. 1) supported by ground engaging members, namely a front ground engaging member, illustratively wheel 6, and a rear ground engaging member, illustratively wheel 8. Vehicle 2 travels relative to the ground on front wheel 6 and rear wheel 8.

Rear wheel 8 is coupled to a power train assembly 10, to propel the vehicle 2 through rear wheel. Power train assembly 10 includes both an engine 12 and transmission 14. Transmission 14 is coupled to engine 12 which provides power to rear wheel 8. In the illustrated embodiment, engine 12 is a 49° V-twin spark-ignition gasoline engine available from Polaris Industries, Inc. located at 2100. Highway 55 in Medina, Minn. 55340. In alternative embodiments, rear wheel 8 is coupled to the drive shaft through a chain drive or other suitable couplings. The drive arrangement in the illustrated embodiment is comprised of a six speed overdrive constant mesh transmission with a carbon fiber reinforced belt available from Polaris Industries, Inc. In alternative embodiments, the transmission is a continuously variable transmission.

It will be appreciated that while the vehicle 2 is illustrated as a two-wheel vehicle, various embodiments of the present teachings are also operable with three, four, six etc. wheeled vehicles. It will also be appreciated that while a spark-ignition gasoline engine is illustrated, electric motors, and other suitable torque-generating machines are operable with various embodiments of the present teachings.

Motorcycle 2 also generally includes a steering assembly 20, front suspension 22, rear suspension (not shown), and seat 26. Steering assembly 20 includes handlebars 28 which may be moved by an operator to rotate front wheel 6 either to the left or the right, where steering assembly is coupled to the motorcycle frame. Engine operating systems are also included such as an air intake system 32 and exhaust system 34. Operator controls are also provided for operating and controlling vehicle 2, which may include vehicle starting system 36, vehicle speed controls 40 and vehicle braking systems 42. Ergonomic systems may include front fender 44, rear fender 46, front fairing 50, windshield assembly 52 and saddlebag assembly 54. A closeout assembly 60 is also provided between the rear fender 46 and saddlebag assembly 54, where the closeout assembly includes a removable closeout portion 62 and a fixed closeout assembly 64. With reference now to FIGS. 2-10, closeout assembly 60 will be described in greater detail.

Figure 2:
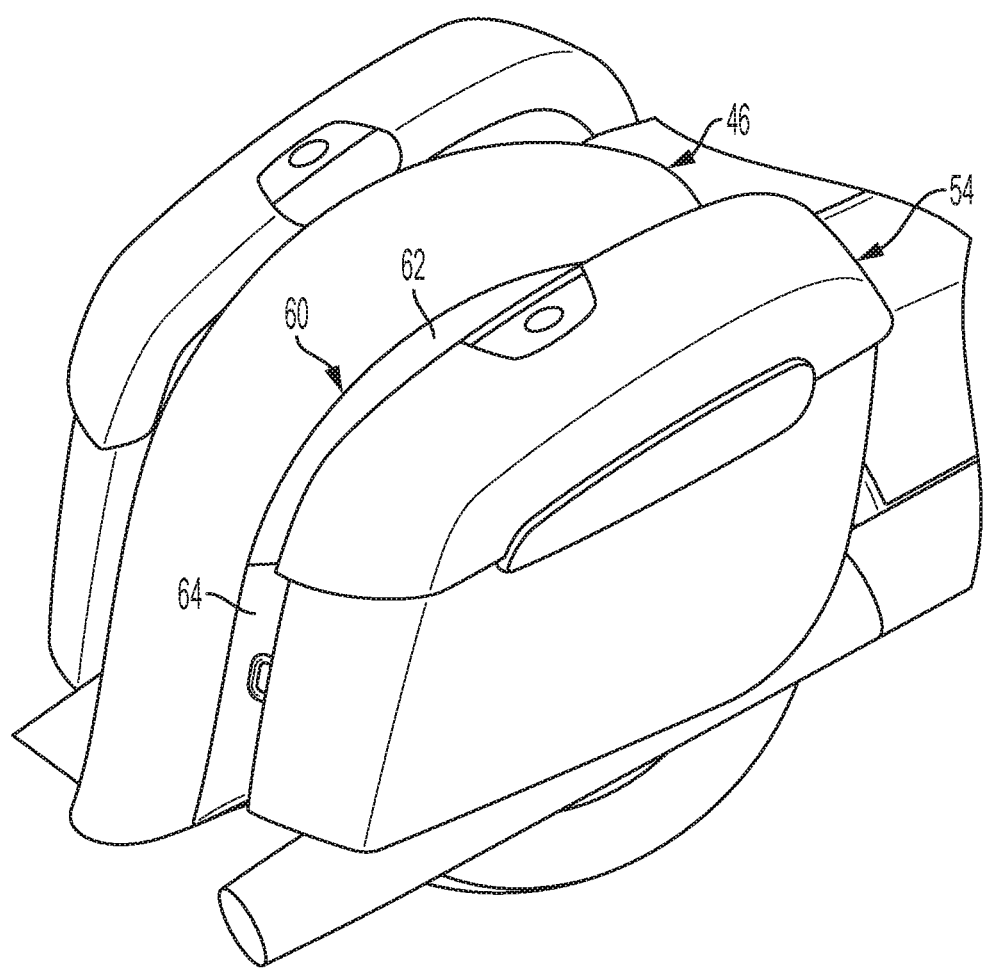
FIG. 2 is a right rear perspective view of the saddlebag assembly of the two-wheeled vehicle of FIG. 1.
Figure 3:
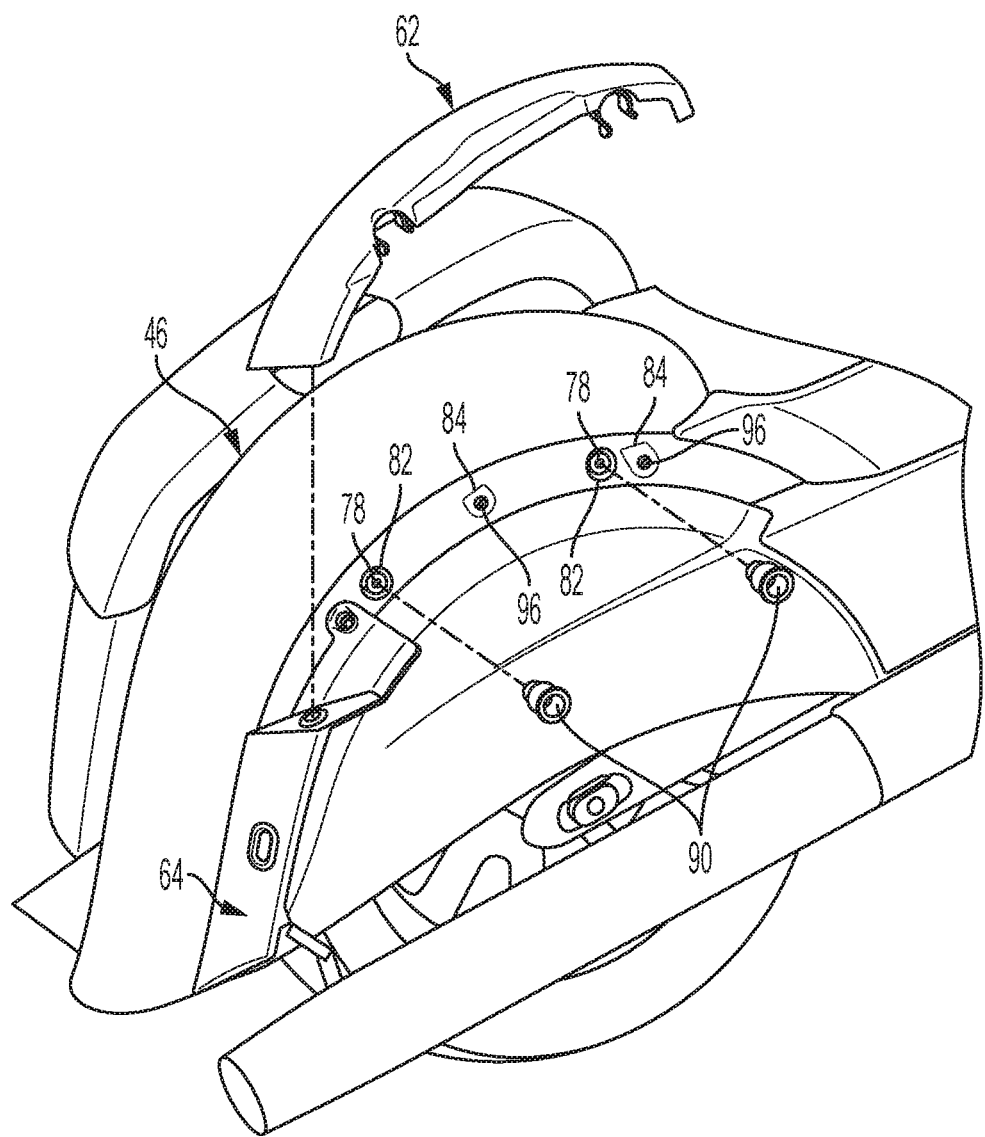
FIG. 3 is a view similar to that of FIG. 2, showing a closeout removed from the vehicle.
Figure 4:
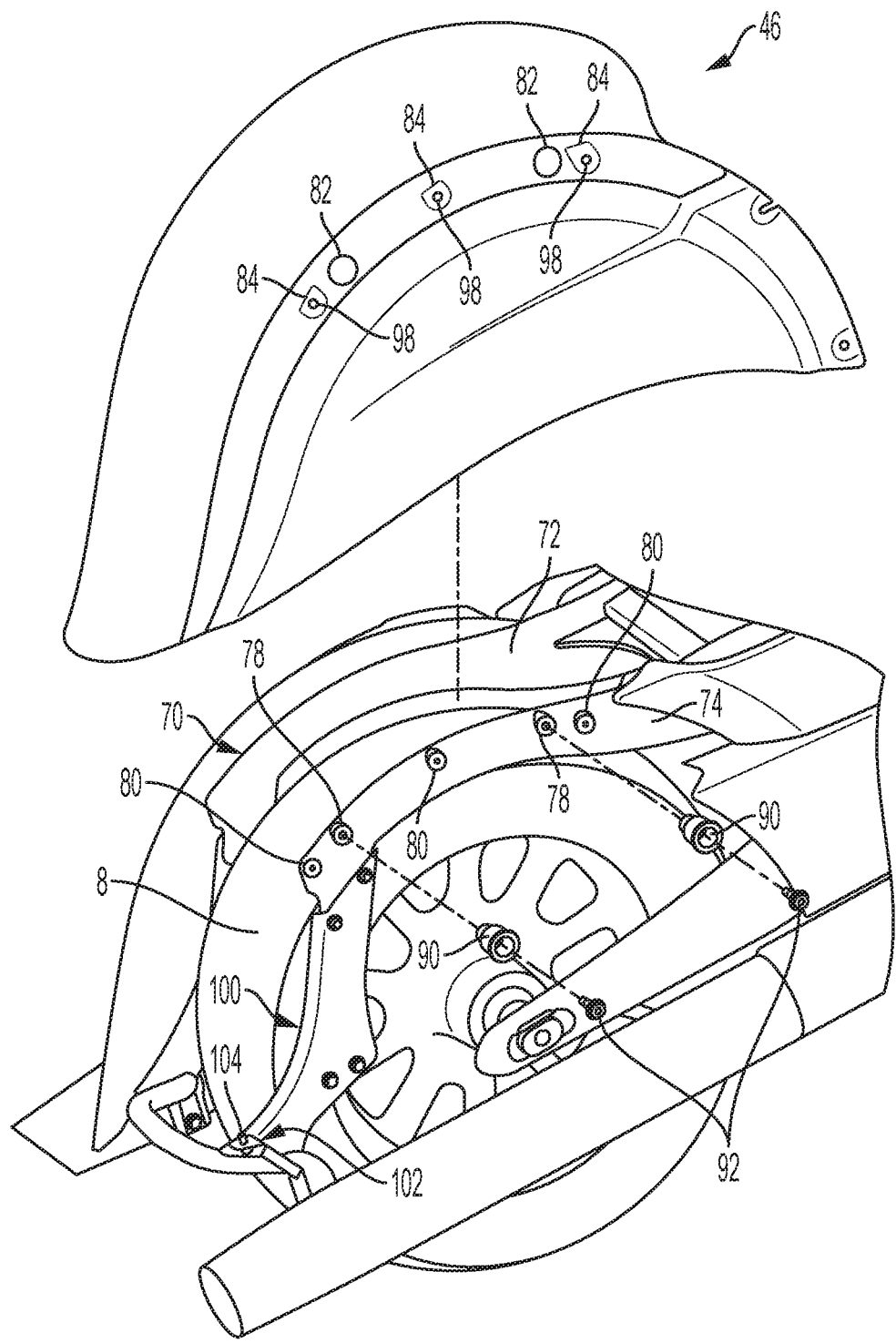
FIG. 4 is a right rear perspective view of the vehicle with the fender removed showing mounting elements exploded away from the vehicle frame.

With reference now to FIGS. 2-4, the fender 46 and saddlebag assembly 54 will be described in greater detail. With reference first to FIG. 4, fender 46 is shown exploded above a rear portion of the vehicle, and spaced away from rear wheel 8. A rear portion 70 of frame 4 is shown where frame portions 72 and 74 flank rear wheel 8. It should be appreciated that each of the left 72 and right 74 frame portions are mirror images of each other and thus only one frame portion, mainly right frame portion 74, will be described. As shown, rear frame portion 74 includes a first set of bosses 78 having a threaded aperture therethrough and a second set of bosses 80 also having a threaded aperture therethrough. Fender 46 includes a first set of apertures at 82 which when in the position of FIG. 3, align with and provide an access to bosses 78. Fender 46 also includes mounting lands at 84 which when in the position of FIG. 3, align with corresponding bosses 80. As shown in FIGS. 3 and 4, couplers 90 may be attached to bosses 78 by way of fasteners 92 (FIG. 4) which may be received through couplers (or mounting elements) 90 and into the threaded apertures of bosses 78. As shown best in FIG. 3, fasteners 96 are provided through apertures 98 of lands 84 (FIG. 4) which may be threadably engaged with bosses 80.

Figure 8:
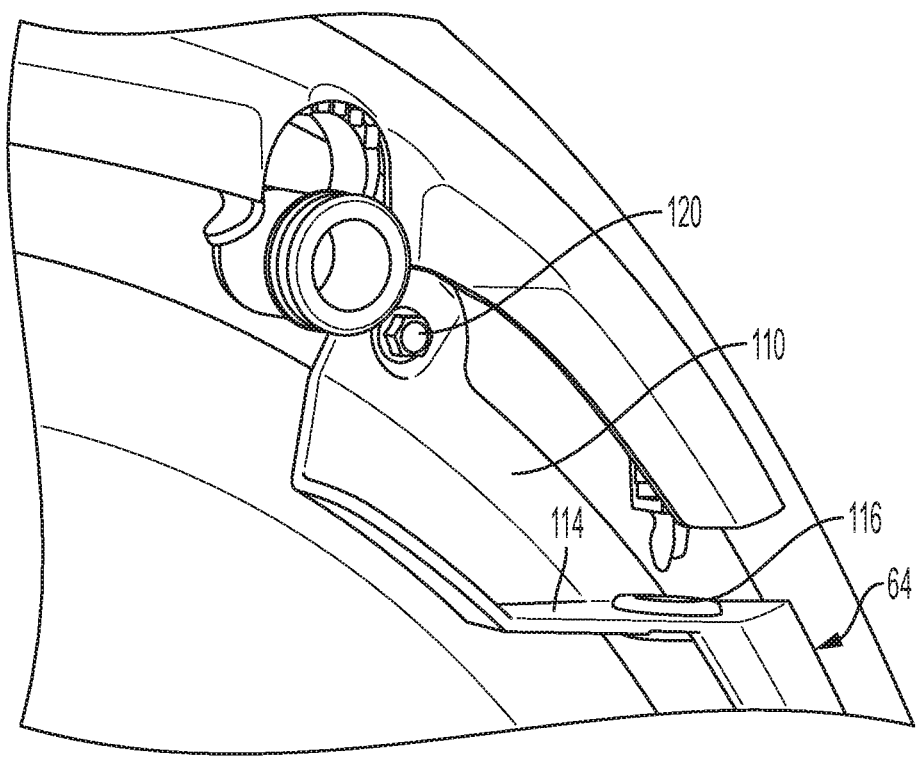
FIG. 8 is a front perspective view of the left-side closeout being snap-fitted to the frame.
Figure 10:
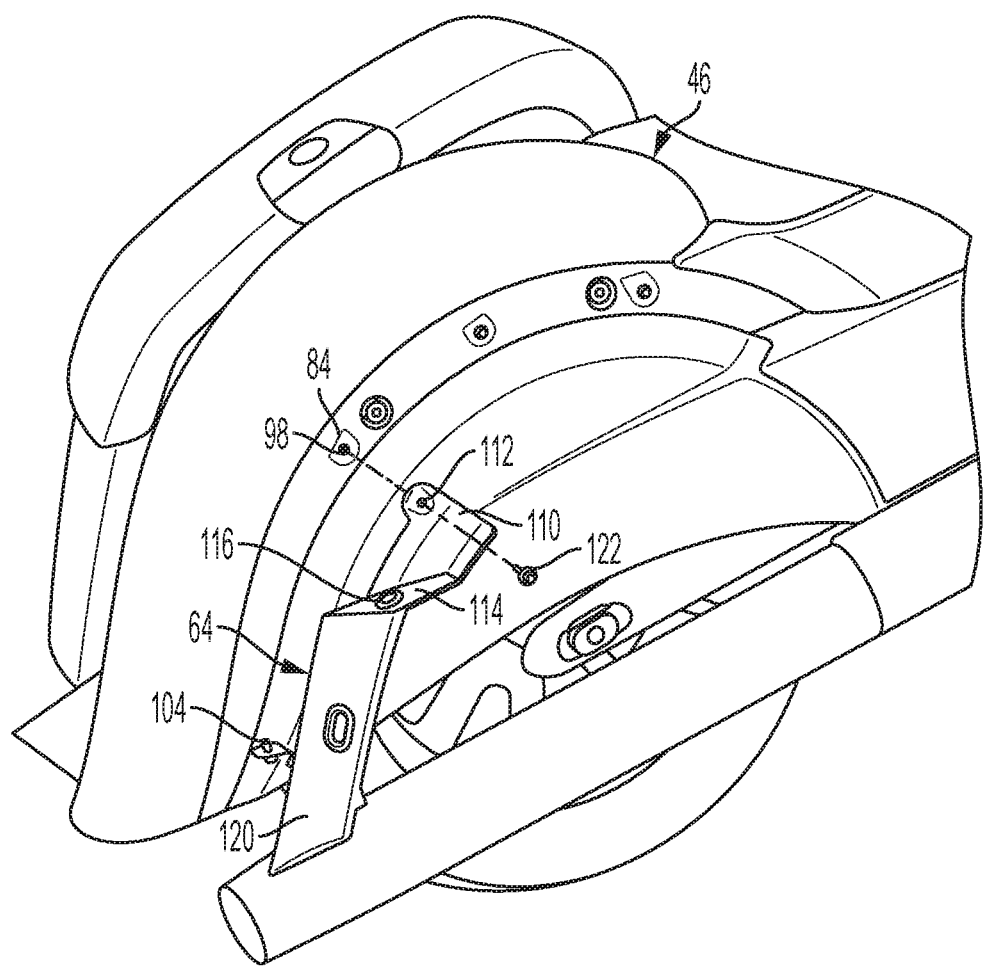
FIG. 10 is a right rear perspective view showing the saddlebag removed and the lower closeout exploded from the vehicle frame.

As shown in FIG. 4, a lower frame portion 100 is provided which is coupled to rear frame portion 74. Frame portion 100 includes a lower bracket at 102 having an upstanding peg at 104. Lower closeout 64 is shown in FIGS. 8 and 10 to include a flange portion 110 which is profiled to lie against fender 46 having an aperture at 112. Lower closeout 64 also includes an upper ledge at 114 having a locating hole at 116. A rear wall 120 extends downwardly from ledge 114 and fills the gap between saddlebag 54 and fender 46. Lower closeout portion 64 includes an aperture which sits over peg 104, which locates the lower closeout 64 relative to the fender 46. A fastener 122 is provided which may be placed through aperture 112 and threaded into opening 98.

Figure 5:
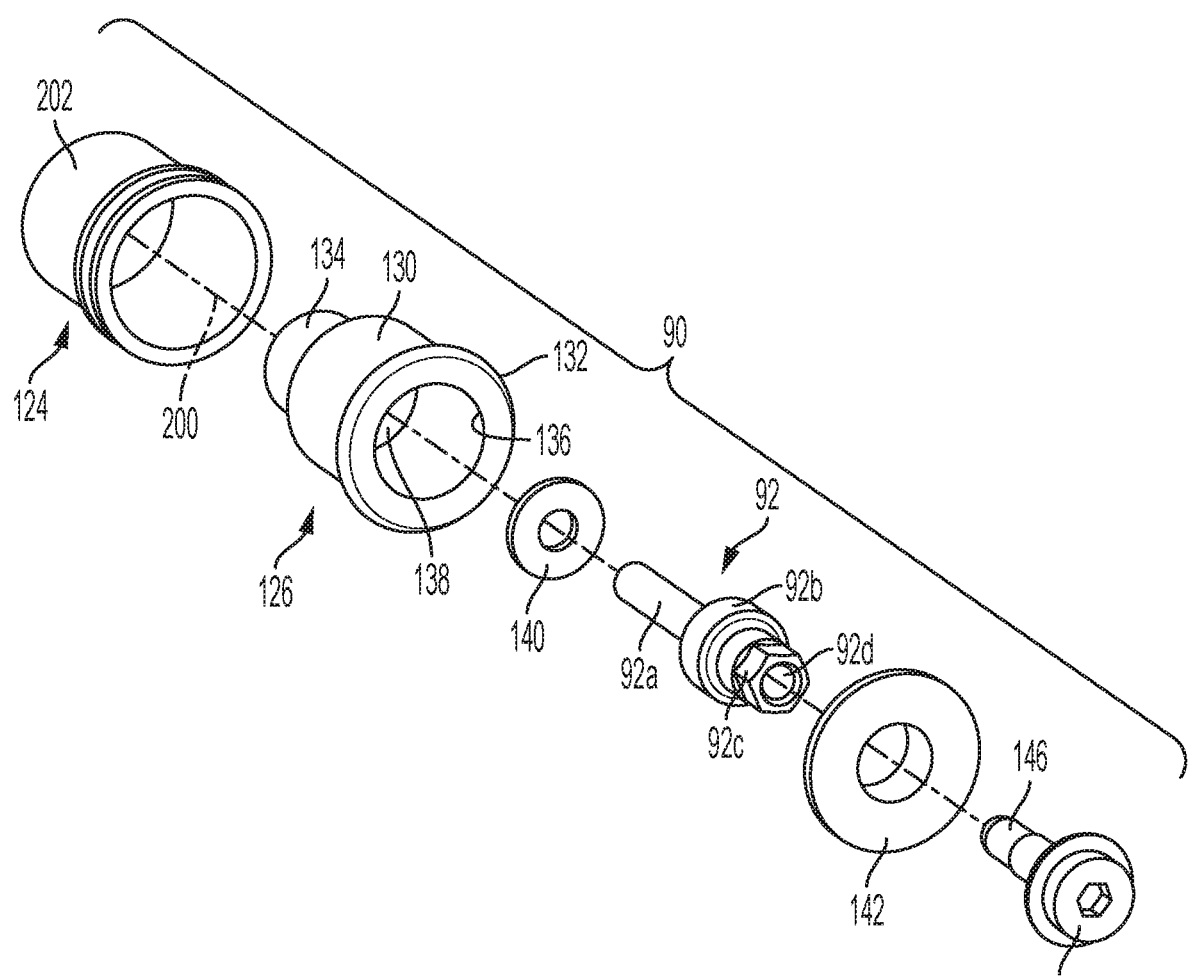
FIG. 5 is an exploded perspective view of the mounting element to which the closeout is snap-fitted.

With reference now to FIG. 5, coupler 90 is shown in greater detail. As shown, coupler 90 generally includes a spool member 124 and a post member 126 as well as a plurality of fasteners as described herein. Post member 126 includes a shank portion 130, a head portion 132 and a post portion 134. Post member 126 further includes an internal bore at 136 extending rearwardly to a rear wall 138 where wall 138 includes an aperture which extends from wall 138 through the post portion 134 in order to receive fasteners 92 and 140 (FIGS. 4 and 5). As shown best in FIG. 5, fastener 92 includes a threaded portion 92a, an enlarged portion 92b, a hex portion 92c and an aperture at 92d. Coupler 90 further comprises a washer 142 and a fastener 144 having an attachment section 146.

Figure 6:
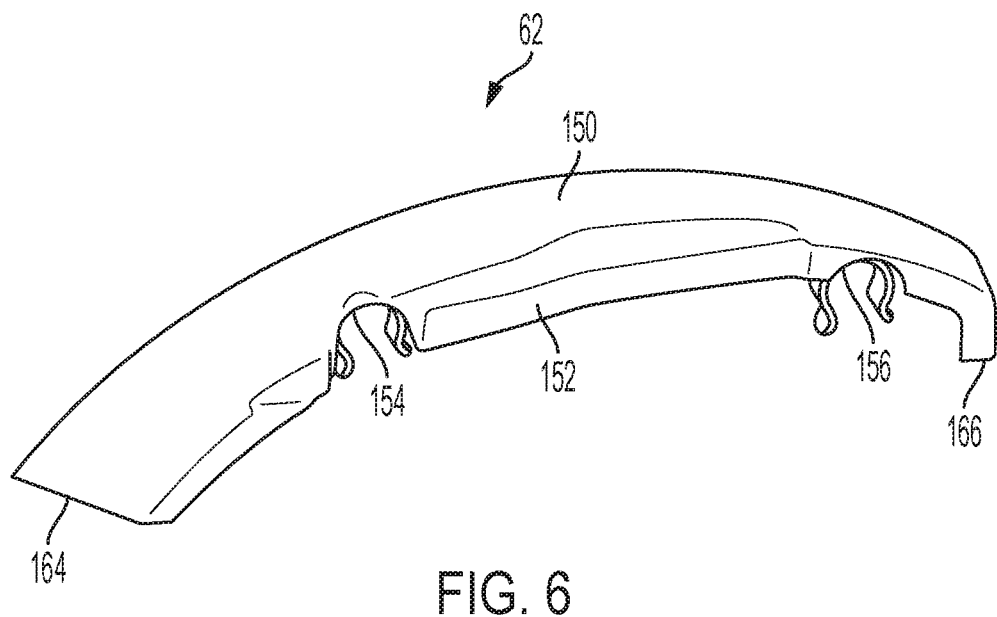
FIG. 6 is a right side perspective view of the closeout shown in FIG. 3.
Figure 7:
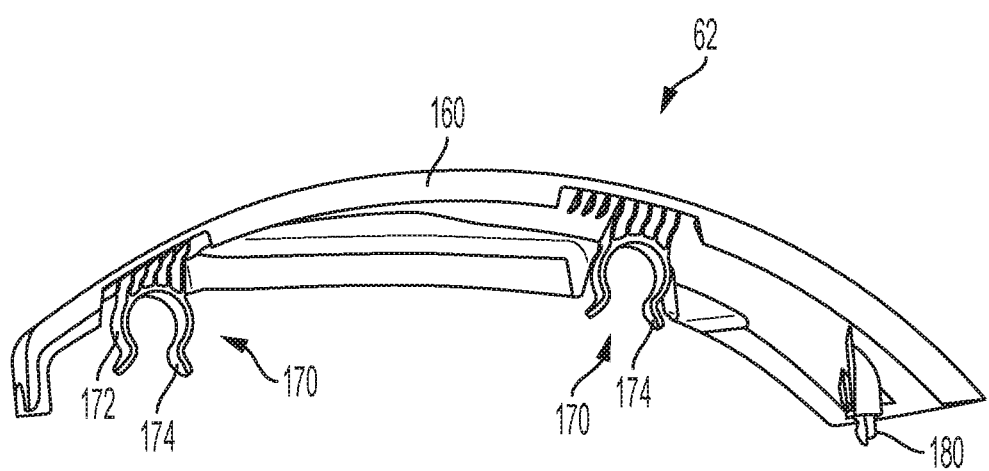
FIG. 7 is a left side perspective view of the closeout shown in FIG. 6.

With reference now to FIGS. 6 and 7, the removable closeout portion 62 includes an arcuately-shaped upper cover portion 150 having an outside wall at 152 having arcuately-shaped openings 154, 156 and an inside wall at 160. Upper cover portion 150 includes a rear edge at 164 and a front edge at 166. As shown, spring fingers 170 are provided having individual clip arms 172 having lead-in portions 174. Closeout portion 62 also includes a locating peg at 180. As shown in FIG. 8, locating hole 116 and locating peg 180 define a locating device between the upper and lower closeouts 62, 64.

Figure 9:
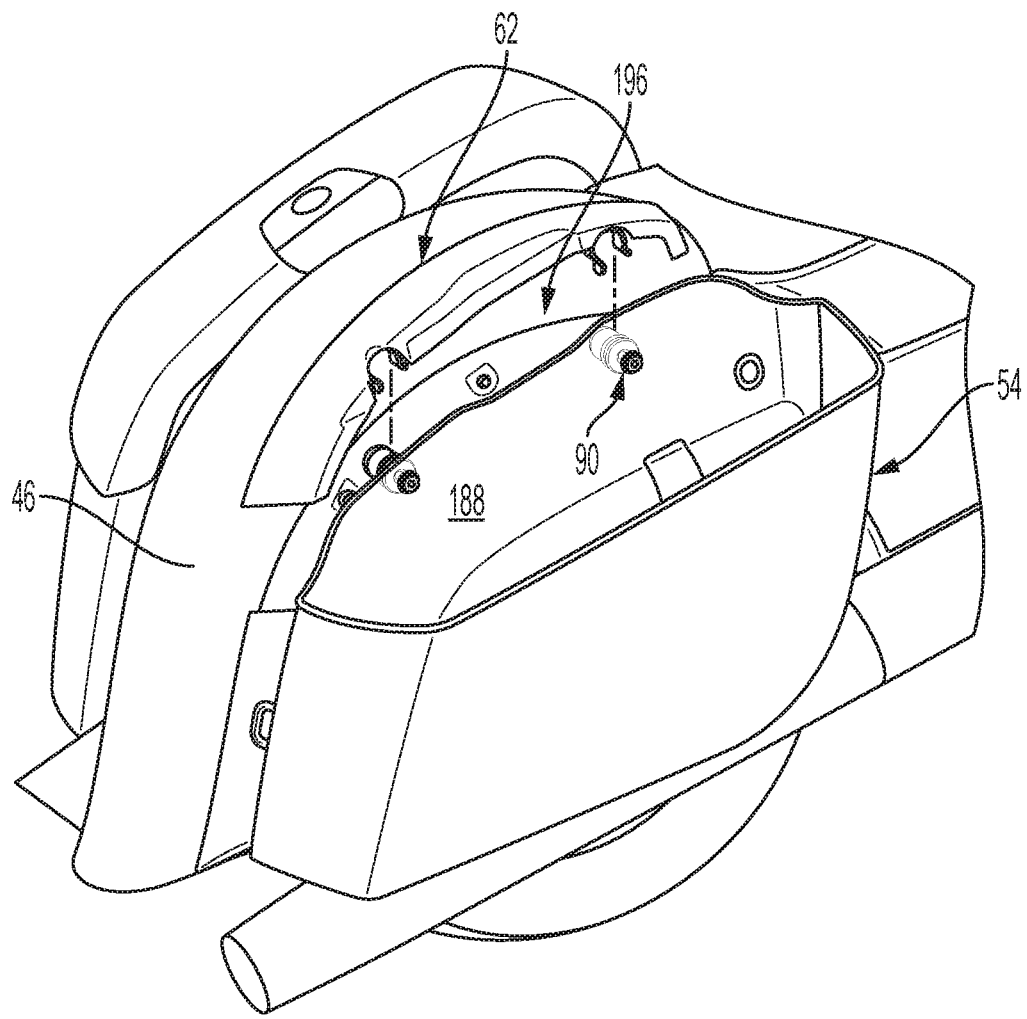
FIG. 9 is a right rear perspective view showing the closeout positioned above the gap formed between the fender and the saddlebag.

As shown best in FIG. 9, saddlebag 54 includes an inner wall at 188 having couplers 90 attached thereto, where couplers 90 operate as shown in FIG. 5. More particularly, the post member 126 is inserted into the spool member 124 and the fasteners 92, 140 are then inserted through the post member and into threaded engagement with threaded bosses 78. The intent is to leave the entire coupler (with the exception of fasteners 142 and 144) on the vehicle at all times. The fasteners 142 and 144 are only used when the saddlebag 54 is mounted to the fender 46. The fasteners 144 have attachment section 146 which couples with aperture 92d of fasteners 92. The inner wall 188 of saddlebag 54 includes apertures which accept the attachment section 146 of fastener 144 therethrough, while aperture 92d is on the backside of wall 188.

Fastener section 146 may be threads, interference fit, or may operate under the concept described in U.S. Pat. No. 7,055,454, the disclosure of which is expressively incorporated herein by reference, also known as Assignee's LOCK AND RIDE® EXPANSION COUPLER MOUNTS". The saddlebag configurations may also be designed per the disclosures of U.S. Pat. No. 9,394,859 entitled "TWO-WHEELED VEHICLE", or U.S. Pat. No. 9,421,860 entitled "TWO-WHEELED VEHICLE", the disclosures of which are expressly incorporated by reference herein.

With reference still to FIG. 9, when the saddlebag 54 is mounted to the vehicle, a space 196 exists between the saddlebag 54 and the fender 46 such that the upper closeout portion 62 may be positioned in the gap 196 with the spring clip arms 172 (FIG. 7) engaging with the spool portion 124 (FIG. 5) of the coupler 90 to provide aesthetics to the rear portion of the vehicle. If a further accessory needs to be mounted to the couplers 90 (for example, a trunk) the upper closeout portions 62 may simply be removed without the use of tools, and the accessory may be coupled to the rear portion of the vehicle. A trunk for use with the vehicle as described herein is shown and described in greater detail in U.S. Pat. No. 9,394,859, the subject matter of which is incorporated herein by reference.

Thus, an aesthetically pleasing assembly is provided by the above with minimal complexity as both the saddlebag 54 and the removable closeout 62 attach via the same coupler. That is, and with reference again to FIG. 5, the saddlebag 54 couples along a centerline axis 200 of the coupler, whereas the removable closeout 62 couples to the coupler 90 about the outer surface 202 of spool portion 124. It should be understood however, that the saddlebag 54 and the removable closeout 62 could attach via different couplers.

Also when in the position shown in FIG. 2, the upper (removable) closeout 62 and the lower and fixed closeout portion 64 provide a continuous complementary outer surface. As shown, the complementary outer surface is curvilinear and generally conforms to the outer contour of the fender 46. As shown, the outer profile of the upper closeout 62 and the lower closeout portion 64 is smaller than the outer profile of the fender 46. The closeout portions 62, 64 would most likely be formed of a plastic type material, such that the spring fingers can be flexible enough to expand and retract about the coupler 90 as described above. As shown, the upper closeout 62 is made from a single composition; however, the spring fingers could be made from another material such as a metallic material and fixed in place to the remaining portion of the closeout 62.

Also the intent would be that the upper closeout 62 and the lower closeout portion 64 are the same color to match the remainder of the vehicle and to appear seamless together. Also the upper closeout 62 and the lower closeout portion 64 are designed such that the width is substantially equal (although slightly smaller) as the gap, so that their combination fills the gap. As mentioned above, if a trunk is to be used, the removable portions 62 are unsnapped from the couplers 90 on both sides of the fender 46, and the trunk is coupled to the couplers.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle, comprising:
at least one front wheel and at least one rear wheel;
a frame supported by the at least one front wheel and the at least one rear wheel;
a seat to support at least one rider;
a rear fender positioned over the at least one rear wheel;
a storage member positioned adjacent to the rear fender and supported by the frame; and
an upper closeout for positioning in a gap defined between the rear fender and the storage member, the closeout being toollessly coupled directly to the rear fender.

2. The vehicle of claim 1, wherein a coupler is supported by the frame and is positioned adjacent to the gap.

3. The vehicle of claim 2, wherein the storage member is coupled to the coupler.

4. The vehicle of claim 3, wherein the coupler is tubular having a centerline axis and an outer surface about the centerline axis.

5. The vehicle of claim 4, wherein the storage member is coupled to the coupler along the centerline axis and the upper closeout is coupled to the outer surface of the coupler.

6. The vehicle of claim 3, wherein at least two spools are provided supported by the frame.

7. The vehicle of claim 2, wherein the coupler comprises a spool positioned against the rear fender.

8. The vehicle of claim 2, wherein the upper closeout having spring clip arms to engage the coupler.

9. The vehicle of claim 1, further comprising a lower closeout fixedly supported by the frame.

10. The vehicle of claim 9, wherein the lower closeout and the upper closeout define a complementary outer surface.

11. The vehicle of claim 10, wherein the complementary outer surface is curvilinear and generally conforms to an outer contour of the fender.

12. The vehicle of claim 11, wherein the complementary outer surface has a width substantially equal to that of the gap so as to cover the gap.

13. The vehicle of claim 10, further comprising a locating device between the upper and lower closeouts.

14. The vehicle of claim 13, wherein the locating device is defined by a locating hole and locating peg on the upper and lower closeouts.

15. The vehicle of claim 1, wherein the storage member is a saddlebag.

16. A vehicle, comprising:
at least one front wheel and at least one rear wheel;
a frame supported by the at least one front wheel and the at least one rear wheel;
a seat to support at least one rider;
a rear fender positioned over the at least one rear wheel, the rear fender comprising at least one coupler;
a storage member positioned adjacent to the rear fender and supported by the frame defining a gap between the storage member and the rear fender; and
an upper closeout for positioning in the gap, the upper closeout having a latching mechanism to engage the at least one coupler and retain the upper closeout in position in the gap.

17. The two wheeled vehicle of claim 16, wherein the latching mechanism is in the form of spring clip arms.

18. The two wheeled vehicle of claim 16, wherein the coupler comprises a spool positioned against the rear fender and the storage member is coupled to the coupler.

19. The two wheeled vehicle of claim 16, further comprising a lower closeout fixedly supported by the frame.

20. The two wheeled vehicle of claim 19, wherein the lower closeout and the upper closeout define a complementary outer surface.

21. The two wheeled vehicle of claim 20, wherein the complementary outer surface is curvilinear and generally conforms to an outer contour of the fender.

22. The two wheeled vehicle of claim 21, wherein the complementary outer surface has a width substantially equal to that of the gap so as to cover the gap.

23. The vehicle of claim 20, further comprising a locating device between the upper and lower closeouts.

24. The vehicle of claim 23, wherein the locating device is defined by a locating hole and locating peg on the upper and lower closeouts.

25. The vehicle of claim 16, wherein the storage member is a saddlebag.

26. A closeout mechanism for filling a gap between a storage member and fender of a vehicle, where the vehicle includes a coupler supported by the frame and positioned adjacent to the gap, the closeout comprising:
an upper closeout for positioning in the gap, the upper closeout having an outer generally smooth surface and a latching mechanism on an inner and opposite surface as the outer surface to engage the coupler and retain the upper closeout in position in the gap, wherein the latching mechanism is in the form of spring clip arms.

27. The closeout mechanism of claim 26, further comprising a lower closeout profiled to be fixedly supported by a frame of the vehicle, where the upper and lower closeouts abut each other.

28. The closeout mechanism of claim 27, wherein the lower closeout and the upper closeout define a complementary outer surface.

29. The closeout mechanism of claim 28, wherein the complementary outer surface is curvilinear and generally conforms to an outer contour of the fender.

30. The closeout mechanism of claim 29, wherein the complementary outer surface has a width substantially equal to that of the gap so as to cover the gap.

31. The vehicle of claim 28, further comprising a locating device between the upper and lower closeouts.

32. The vehicle of claim 31, wherein the locating device is defined by a locating hole and locating peg on the upper and lower closeouts.

\* \* \* \* \*